United States Patent [19]

Doyle et al.

[11] Patent Number: 4,793,981

[45] Date of Patent: Dec. 27, 1988

[54] INTEGRATED INJECTION AND BAG FILTER HOUSE SYSTEM FOR $SO_x$-$NO_x$-PARTICULATE CONTROL WITH REAGENT/CATALYST REGENERATION

[75] Inventors: John B. Doyle, Massitlen; Ed A. Pirsh, Akron; William Downs, Alliance, all of Ohio

[73] Assignee: The Babcock & Wilcox Company, New Orleans, La.

[21] Appl. No.: 932,754

[22] Filed: Nov. 19, 1986

[51] Int. Cl.$^4$ .................... B01J 8/00; C01B 21/00; C01B 17/00
[52] U.S. Cl. ..................................... 423/239; 423/244
[58] Field of Search .................. 423/235, 235 D, 239, 423/239 A, 244 A, 244 R

[56] References Cited

U.S. PATENT DOCUMENTS

| | | | |
|---|---|---|---|
| 931,515 | 8/1909 | Sprague | 423/244 |
| 3,880,618 | 4/1975 | McCrea et al. | 423/239 |
| 4,134,729 | 1/1979 | Libutti et al. | 423/242 |
| 4,164,546 | 8/1979 | Welty | 423/239 |
| 4,434,147 | 2/1984 | Dimpfl et al. | 423/235 |

*Primary Examiner*—Gregory A. Heller
*Attorney, Agent, or Firm*—Vytas R. Matas; Robert J. Edwards

[57] ABSTRACT

A process of controlling emission of $SO_x$, $NO_x$ and particulates from a coal-fired boiler system is disclosed. A reagent/catalyst in powdered form is added into the combustion flue gas stream intermediate the boiler and economizer at a temperature below the melting point of the powder. The reagent/catalyst and ammonia are reacted with the $SO_x$ and $NO_x$ while the flue gas passes through the economizer. Further reaction is achieved as the gas is passed through the filter cake which forms on the filterhouse bags.

6 Claims, 1 Drawing Sheet

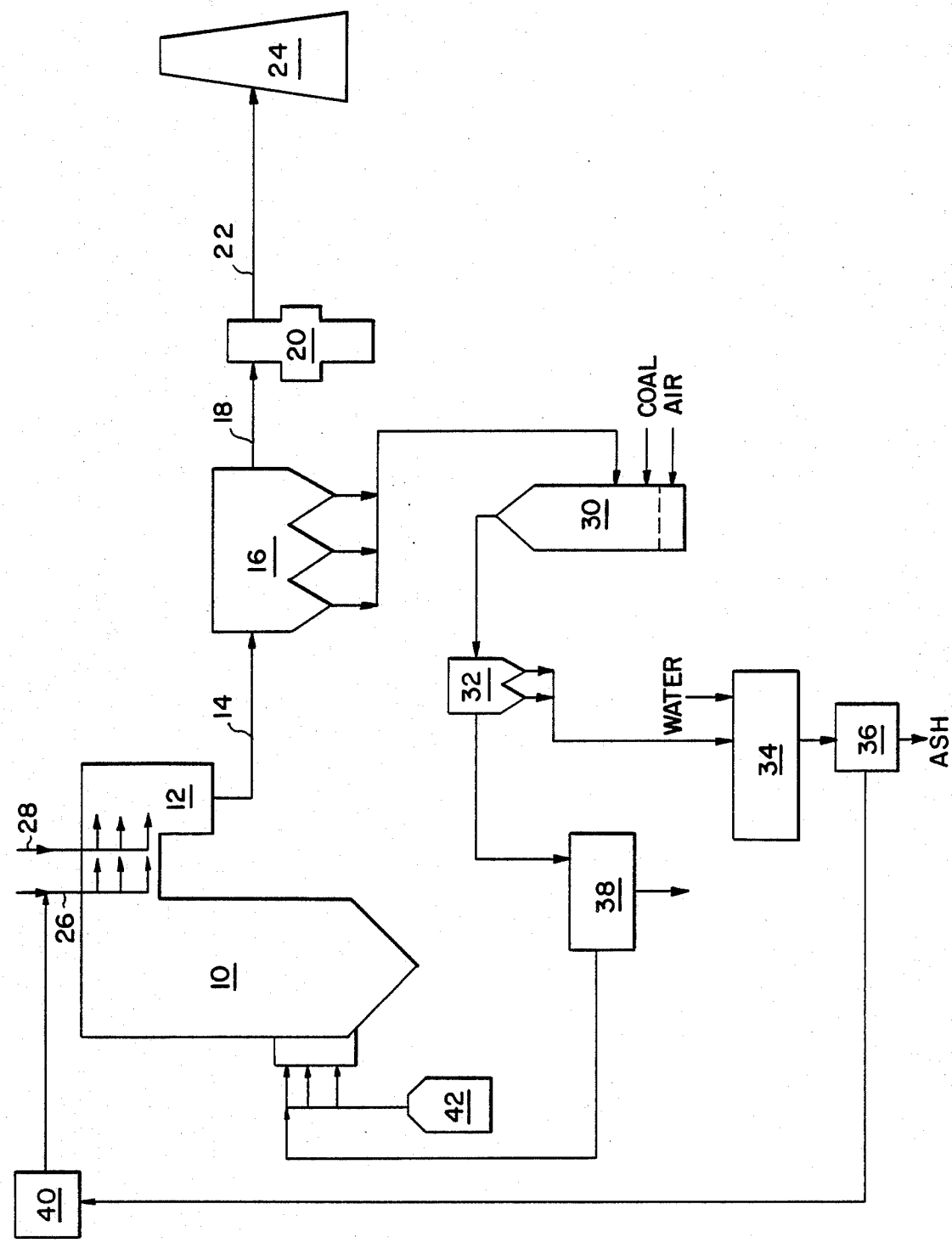

INTEGRATED INJECTION AND BAG FILTER HOUSE SYSTEM FOR SO$_x$-NO$_x$-PARTICULATE CONTROL WITH REAGENT/CATALYST REGENERATION

BACKGROUND OF THE INVENTION

This invention relates to emission control for coal-fired electric power plants and, more particularly, to a new and improved process which employs an integrated injection and fabric filter baghouse system for simultaneous SO$_x$, NO$_x$, and particulates control.

Advanced control technologies have rapidly evolved during the past two decades for dealing with coal-fired power plant emissions of particulates, sulfur oxides and nitrogen oxides.

A dramatic shift to low-sulfur coals, which produce high-resistivity fly-ashes, that are more difficult to collect, and the concurrent demand for increased particulate efficiency, placed a heavy burden on conventional dust collectors (electrostatic precipitators) employed in these applications. Consequently, in the late 1970's the electric utility industry began, on a significant scale, to utilize alternative technology—fabric filterhouses—for particulate control.

In a bag filterhouse, fly-ash is separated from flue gas by filtration, i.e. the fly-ash is collected on the upstream side of the filter bags as the gas is directed through tubular shaped fabric filter bags. The flue gas passes through the bag, typically from the inside out, and the fly-ash is collected as so-called filter cake. The material collected on the bag becomes part of the filtering medium. After a certain build-up of filter cake over the course of operation, the bags must be cleaned to avoid excessive pressure drop in order to maintain proper gas volume flow. The use of a bag filterhouse gives the utility the option of switching coals since bag filterhouse collection efficiency is relatively insensitive to fuel characteristics.

Nevertheless, as coal burns, most of the sulfur content is converted to sulfur oxides (SO$_x$), typically SO$_2$ and SO$_3$. In addition, oxides of nitrogen (collectively referred to as NO$_x$) are formed. The utilization and placement of NO$_x$ and SO$_x$ control equipment upstream of the bag filterhouse will influence inlet conditions. Overall location of the bag filterhouse relative to such equipment, as well as the plant air heaters, flue gas temperature, flue gas composition, and fabric filter specifications including material properties such as composition, tensile strength, abrasion resistance, chemical resistance and temperature limitations comprise the major parameters which must be carefully considered, integrated and controlled in order to achieve satisfactory overall plat emissions control.

In U.S. Pat. No. 4,309,386, which is assigned to the assignee of the present invention, a hot catalytic baghouse (greater than 600° F. was employed for simultaneous particulate removal and NO$_x$ reduction. In accordance with the teachings of that patent, the filter bags were treated with a catalyst to facilitate the selective catalytic reduction process while simultaneously filtering out particulate matter form the gas stream. The baghouse was situated downstream form an ammonia injection system. In the baghouse, the flue as stream was exposed to the treated bags to effect NO$_x$ removal. However, that system has several potential shortcomings. In particular, bags impregnated with the catalyst tend to have a limited life span, necessitating periodic replacement of the entire bag and the catalyst is subject to SO$_x$ poisoning which can lead to loss of ability to reduce NO$_x$ in the present of gases containing high quantities of SO$_x$.

Therefore, continuing improvements are being sought in emission control systems employing catalytic fabric baghouses with satisfactory control of SO$_x$ and NO$_x$ emissions.

SUMMARY OF THE INVENTION

An integrated injection and baghouse system is provided which collects and removes SO$_x$ and particulates from a flue as stream while reducing NO$_x$ to harmless N$_2$.

In accordance with the invention, a suitable reagent/catalyst, such as sodium aluminate, is pneumatically injected into the boiler in fine powder form, in a temperature zone below the melting point of the reagent/catalyst upstream of a hot catalytic baghouse, which is operating in the temperature range of 600° F. to 800° F. (approximately 315° C. to 427° C.), and which is located between the boiler economizer exit and the air heater. Ammonia is also injected in this vicinity. The reaction between the NO$_x$ and ammonia converts the NO$_x$ to harmless nitrogen gas and the reaction between SO$_x$ and the reagent produces a solid particulate which continues to flow with the flue gas. The mixture of reactants, reaction products, and flue gases continue to flow to the baghouse, where the particulates are separated from the flue gas.

The injection technique advantageously provides an extended time for reaction of the reagent/catalyst and the SO$_x$ and NO$_x$ as the flue gas stream flows from the injection point to the fabric filter bags. Further reaction takes place as the solids are collected in the filter bags as filter cake and the flue gases continue to pass through the filter cake.

In accordance with a preferred arrangement of the invention, the reagent/catalyst is removed from the baghouse along with the fly-ash for regeneration. Poisoning of the catalyst with SO$_x$ is no longer a problem since the process of the invention seeks to achieve reaction of the reagent/catalyst with SO$_x$ to remove the sulfur oxides from the gas steam and the reaction is otherwise acceptable due to the continuous replenishment of the reagent/catalyst by regeneration.

BRIEF DESCRIPTION OF THE DRAWING

The sole drawing is a simplified flow diagram illustrating a preferred arrangement embodying the process of this invention.

DETAILED DESCRIPTION

As illustrated in the FIGURE, a coal-fired boiler 10 includes an economizer 12 which is designed, as is well known, to remove heat from the flue gases after the gases leave the steam-generating and superheating sections of the boiler 10. The outlet of the economizer 12 is connected through a flue gas conduit 14 to a baghouse 16 wherein particulates are collect in filter bags (not shown). The treated gas is discharged from the baghouse 16 through a conduit 18 to an air preheater 20 and then through a conduit 22 to stack 24 for ultimate discharge to the atmosphere.

Injection lines 26, 28 are provided for injecting a solid reagent/catalyst and ammonia, respectively, into a zone, having a temperature below the reagent/catalyst melting point upstream of the baghouse 16. As shown in the FIGURE, for example, the solid reagent/catalyst and ammonia are injected upstream of economizer 12, i.e. intermediate of the boiler and economizer.

Pneumatic injection of the reagent/catalyst, via wall injectors, is preferred. The ammonia is preferably injected between the primary superheater and the economizer as placement further upstream would result in excessive loss of ammonia by oxidation. The temperature at the economizer inlet will typically be between 700° F. and 1000° F., and the preferred operating range is 600° F. to 800° F. Reagents are selected which will not react with ammonia in this temperature range.

The combustion flue gas containing particulates $SO_x$ and $NO_x$ reacts with the reagent/catalyst as it flows through the economizer 12 and to the baghouse 16. As the gas flows from the injection point through the baghouse, the catalyst reacts with $SO_x$ and $NO_x$ and ammonia ($NH_3$). The catalyst reacts further as it collects in the filter bags and the flue gas passes through it.

Sodium aluminate is the preferred reagent catalyst. Other reagent/catalyst include transition metal oxides of titanium, vanadium, manganese, cobalt, iron, nickel, copper and zinc; alumina (particular gamma phase) and alkalized alumina; alkali and alkaline earth oxides and carbonates; and minerals such as dawsonite, analcite, magnesioriebeckite, feldspars, alunite, anatase, azurite, bauxite, bunsanite, gothite, hematite, iron spinel, ilmenite, malachite, manganite, manganosite, mellite, siderite, and spinel.

The spent reagent/catalyst is removed from the baghouse 16 with the fly-ash.

The spent material contains the sulfur from the flue gas in the form of sulfates and sulfites. The spent material and fly-ash are then fed into a fluid beg gasifier 30 where coal is added as a fuel source and the temperature of the sulfate spent material is raised to a level where the sulfur is driven off in the form of sulfur dioxide and hydrogen sulfide. The reagent/catalyst is then removed from the gas stream with the fly-ash via a particulate collector 32, such as a secondary baghouse, precipitator, or high efficiency cyclone. The collected solids are then slurried with water in a mixing tank 34. The reagent/catalyst goes into solution. The slurry is then directed to a solid separator 36, such as a belt filter or centrifuge where the ash is removed form the system. The solution containing the regenerated reagent/catalyst is then recycled as make-up back to the boiler 10. A drier 40 may be required prior to injecting the reagent/catalyst into the boiler.

The spent gas from the fluid bed gasifier would be taken to a Klaus plant 38 where the $SO_2$ and $H_2S$ would be recovered in the form of elemental sulfur. A portion of the steam produced in the fluid bed gasifier 30 would be used for the operation of the Klaus plant 38. The low Btu gas would then be sent back to the boiler 12 as additional fuel with pulverized coal from the pulverizer 42 or could be used for other plant process requirements. There is a possibility that this gas could be used in the production of ammonia ($NH_3$) which in turn could be used as the make-up for the $NO_x$ reduction process.

The invention claimed is:

1. A method of controlling emission of pollutants from a coal-fired boiler system, the system being of the type including a boiler, an economizer, a fabric filter baghouse and an air heater in a serial fluid communication path, by removing, $SO_x$, $NO_x$ and particulates from a combustion flue gas stream passing through the path comprising the steps of:
   (a) adding a reagent, said reagent further being a catalyst selected from the group consisting of alumina, alkalized alumina, sodium aluminate, dawsonite, analcite, magnesioriebeckite, feldspar, alunite, anatase, azurite, bauxite, bunsenite, gothite, hematite, iron spinel, ilmenite, malachite, manganite, manganosite, mellite, siderite, spinel, and metal oxides of titanium, vanadium, manganese, cobalt, iron, nickel, copper and zinc in powdered form and ammonia into the combustion flue gas stream upstream of the fabric filter baghouse intermediate the boiler and the economizer in a temperature zone having a temperature below the melting point of the reagent;
   (b) reacting some of the reagent and ammonia with the $SO_x$ and $NO_x$ to form reaction products while passing the flue gas stream to the baghouse.
   (c) separating the particulates, the reaction products and reagent from the flue gas within the temperature range by filtration in the baghouse to form a filter cake;
   (d) passing the flue gas stream through the filter cake to react additional reagent and ammonia with the $SO_x$ and $NO_x$ to form additional reaction products and cleansed gas; and
   (e) venting the cleansed gas out of the baghouse through the air heater.

2. A method as set forth in claim 1 wherein the reacting step (b) comprises reacting some of the reagent and ammonia with the $SO_x$ and $NO_x$ to form reaction products while passing the flue gas stream through the economizer to the baghouse.

3. A method as set forth in claim 1 further comprising reclaiming reagent from the cake by heating the cake to a temperature sufficient to volatilize and drive off sulfur dioxide and hydrogen sulfide from the cake and form remaining solids containing recoverable reagent, slurrying the collected solids with water, separating the recoverable reagent from the solids, and wherein the adding step (a) includes passing the reagent into the combustion gas steam.

4. A method of controlling emissions of pollutants from a coal-fired boiler system, the system being of the type including a boiler, an economizer, a fabric filter baghouse and an air heater in a serial fluid communication path, by removing $SO_x$, $NO_x$ and particulates from a combustion flue gas stream passing through the path, comprising the steps of:
   (a) adding a reagent, said reagent further begin a catalyst, selected from the group consisting of alkali and alkaline earth hydroxides, carbonates, or oxides in powdered form and ammonia into the combustion flue gas stream upstream of the fabric filter baghouse intermediate the boiler and the economizer in a temperature zone having a temperature below the melting point of the regent;
   (b) reacting some of the reagent and ammonia with the $SO_x$ and $NO_x$ to form reaction products while passing the flue gas steam to the baghouse;
   (c) separating the particulates, the reaction products and reagent from the flue gas within the temperature range by filtration in the baghouse to form a filter cake;
   (d) passing the flue gas steam through the filter cake to react additional reagent and ammonia with the $SO_x$ and $NO_x$ to form additional reaction products and cleansed gas; and (e) venting the cleansed gas out of the baghouse through the air heater.

5. A method as set forth in claim 4 wherein the reacting step (b) comprises reacting some of the reagent and ammonia with the $SO_x$ and $NO_x$ to form reaction products while passing the flue gas stream through the economizer to the baghouse.

6. A method as set forth in claim 4 further comprising reclaiming reagent from the cake by heating the cake to a temperature sufficient to volatilize and drive off sulfur dioxide and hydrogen sulfide from the cake and form remaining solids containing recoverable reagent slurrying the collected solids with water, separating the recoverable reagent form the solids, and wherein the adding step (a) includes passing the reagent into the combustion gas stream

* * * * *

UNITED STATES PATENT AND TRADEMARK OFFICE
CERTIFICATE OF CORRECTION

PATENT NO. : 4,793,981

DATED : Dec. 27, 1988

INVENTOR(S) : Doyle, et al

Page 1 of 2

It is certified that error appears in the above-identified patent and that said Letters Patent is hereby corrected as shown below:

In Col. 1, line 54, kindly delete "plat" and insert therefor --plant--.

In Col. 1, line 64, kindly delete "as" and insert therefor --gas--.

In Col. 2, line 3, kindly delete "present" and insert therefor --presence--.

In Col. 2, line 12, kindly delete "as" and insert therefor --gas--.

In Col. 2, line 61, kindly delete "collect" and insert therefor --collected--.

In Col. 3, line 35, kindly delete "beg" and insert therefor --bed--.

In Col. 3, line 46, kindly delete "form" and insert therefor --from--.

In Col. 4, line 44, kindly delete "steam" and insert therefor --stream--.

In Col. 4, line 53, kindly delete "begin" and insert therefor --being--.

In Col. 4, line 59, kindly delete "regent" and insert therefor --reagent--.

In Col. 4, line 62, kindly delete "steam" and insert therefor --stream--.

UNITED STATES PATENT AND TRADEMARK OFFICE
CERTIFICATE OF CORRECTION

PATENT NO. : 4,793,981

DATED : Dec. 27, 1988

INVENTOR(S) : Doyle, et al.

It is certified that error appears in the above-identified patent and that said Letters Patent is hereby corrected as shown below:

In col. 6, line 7, kindly delete "form" and insert therefor --from--.

Signed and Sealed this

Nineteenth Day of February, 1991

*Attest:*

HARRY F. MANBECK, JR.

*Attesting Officer*  *Commissioner of Patents and Trademarks*